Dec. 19, 1967  L. R. CHRISTENSEN  3,359,550
TILT CONTROL DEVICE
Filed April 15, 1965
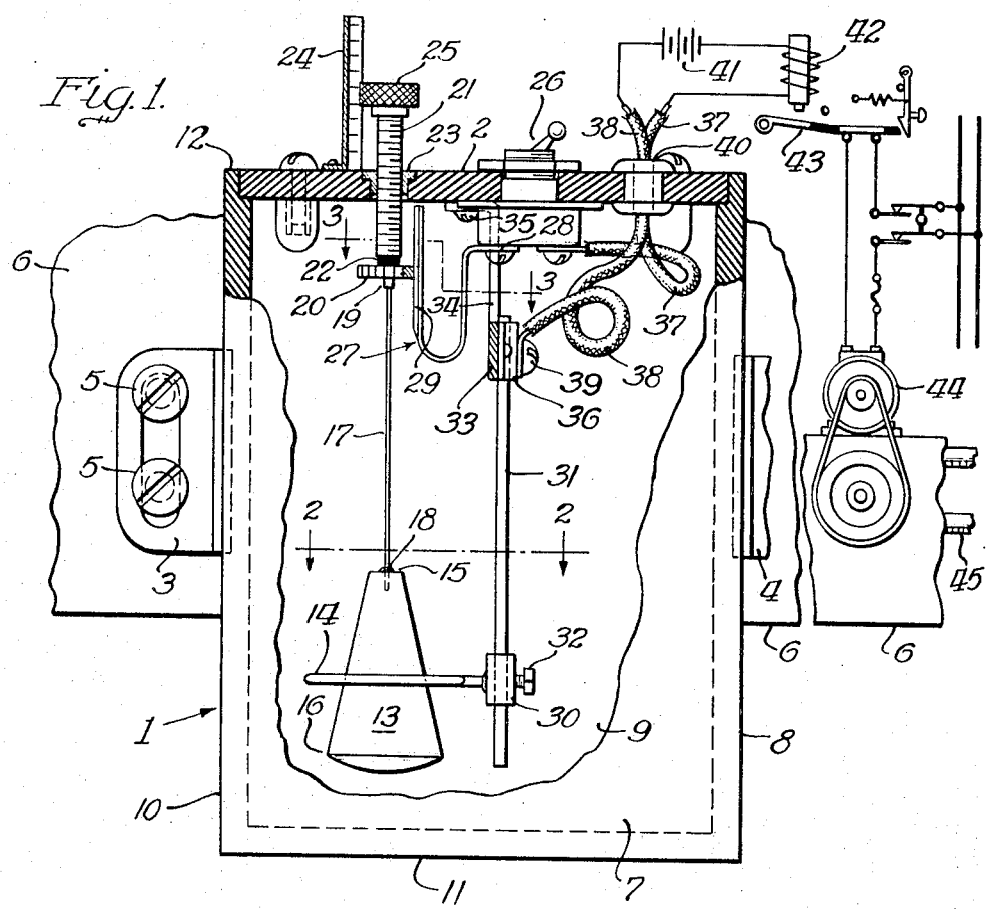
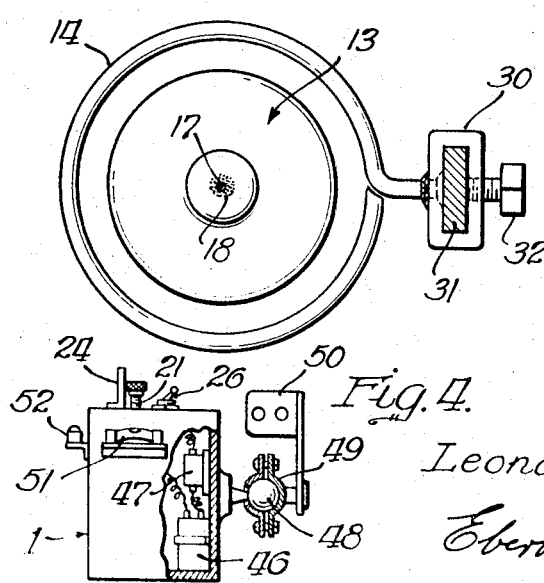
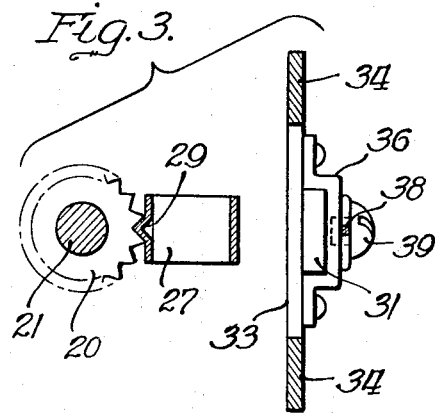
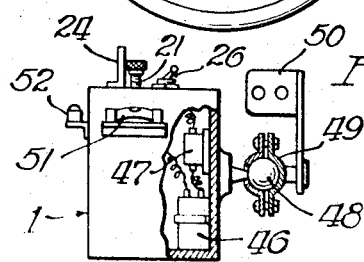
INVENTOR:
Leonard R. Christensen
BY
Eberhard E. Wattley
Atty.

United States Patent Office 3,359,550
Patented Dec. 19, 1967

3,359,550
TILT CONTROL DEVICE
Leonard R. Christensen, 4205 Fullerton Ave.,
Chicago, Ill. 60639
Filed Apr. 15, 1965, Ser. No. 448,367
8 Claims. (Cl. 340—282)

ABSTRACT OF THE DISCLOSURE

A tilt control device attachable to an apparatus or machine to automatically sound an alarm, provided a signal or energize or deenergize a circuit whenever the piece of equipment controlled is canted or moved out of its normal operational limits or positions.

---

This invention relates to a tilt control device which will automatically supply a warning signal or interrupt a circuit to shut off a mechanism being guarded by such a control.

More specifically, this invention is directed to a simple compact electrical control device which can be mounted upon any type of apparatus that depends upon a predetermined level of operation or on a predetermined angle of manipulation for operative function so that any deviation beyond a given limit in the normal setup of such apparatus will activate the control devices associated therewith to sound an alarm or to stop the operation of the particular apparatus.

There are many instances where certain kinds of machinery or chemical apparatus will require constant operation at a given level or at a given cant as the case may be, when taken in relation to a horizontal reference surface. When any change of such unit out of their original normal positions could cause physical damage to such units or could cause spilling of the products being processed or conveyed as the case may be, a signal or automatic control would be of great value.

It is an object of this invention to provide a tilt control device that can be attached to any apparatus or to any machine to tend that particular piece of equipment to automatically sound an alarm of suitable kind or to energize or interrupt a circuit for the regulation or termination of the operation of the particular apparatus or machine with which the tilt control device is associated by predetermined mounting means.

Another object of the invention is to provide a tilt control means that likewise functions under inertia change conditions to supply a given signal or to act upon a predetermined circuit when a door or gate is opened by children as at the head of a staircase, or for example, when a forbidden cabinet door or a drawer is moved at an unauthorized time.

A further object is to provide a tilt control device of the kind above mentioned which has its own self-contained batteries and alarm bell or buzzer.

It is a still further object to provide a tilt control means of the character above named which includes a regulation arrangement to alter the sensitivity of operation of the device to fit the particular condition of application to which it is adapted and, in other words, to be rendered more or less responsive to different amounts of tilt, swing or motion of the means that carries the tilt control means.

Other objects and advantages of the device of this invention shall hereinafter be mentioned in or become apparent from the following detailed description of the invention having reference to the accompanying drawing forming a part of this specification.

In the drawing:

FIG. 1 is a side elevational view of the tilt control device having various portions thereof broken away and shown in section to provide a clearer disclosure of the apparatus, said illustration including a diagrammatic circuit arrangement to demonstrate one adaption of the device;

FIG. 2 is an enlarged detailed cross sectional view taken along the line 2—2 in FIG. 1;

FIG. 3 is another enlarged detailed cross sectional view taken along the line 3—3 in FIG. 1;

FIG. 4 is a side elevational view of a modified arrangement of tilt control device of a self-contained type and one which is provided with a universal suspension or mounting means thereon.

The tilt control device is well shown in FIG. 1 and comprises a housing 1 with a cover 2 that carries the control mechanism in suspension within housing 1 and suitable attachment brackets such as 3 and 4 are connected with housing 1 for securement by means of screws 5 or the like to a conveyor 6 or other machine part. The housing 1 is made with four true vertical sides 7, 8, 9 and 10 terminating with squared right angularly positioned top and bottom faces 11 and 12, the cover 2 fitting into and forming a greater portion of the top. This relationship of a squared cubicle structure provides a means to orient the tilt control device with a level to set up the internal mechanism for its designed operative relationship with respect to the device to which it is connected or to conveyor 6 as illustrated in FIG. 1.

The tilt or alarm control mechanism comprises a floating contact 13 and a fixed ring 14 surrounding the contact 13 in a selected position vertically thereof. The contact 13 is a weight member acting as a plumb bob and it is shaped as a frusto-conical unit with its small diameter at the top end 15 and its larged diameter at the bottom end 16. A flexible cable or wire 17 is secured at 18 to the conical contact 13 and this wire is centrally secured at 19 to a ratchet wheel 20 forming an integral part of an adjusting screw 21 but electrically separated therefrom by a suitable insulating portion 22 connecting the ratchet and screw.

Screw 21 is threaded through a sleeve 23 in cover 2 and an upright ruled gauge 24 provides indicia means for the head 25 of screw 21 to have a visual arrangement as a guide to the vertical location of the conical contact 13 in relation to the housing and/or to the normally fixed ring contact 14.

The entire floating contact assembly including the cable or wire 17, connecting sleeve 19, ratchet wheel 20, screw 21 and its head 25 are symmetrical so that rotation of this assembly on its axis for vertical adjustment of the tapered sided conical contact 13 relative to the interior of ring contact 14 does not cause any change radially in their normal coaxial relationship. Any tilt to a given angle of adjustment of the device or sudden motion of the tilt control device in any lateral direction will complete a circuit through members 13 and 14 to energize an alarm or to energize suitable electrical equipment to accomplish a given result.

Thus it is to be understood that any tilt of the control device housing will cause the conical weighted contact 13 to swing into electrical contact with the internal surface of ring 14. This will happen when the vertical tilt is great enough in any direction to move contact 13 anywhere within the 360 degree extent of the ring contact. Also, the amount of angular tilt in any direction can be regulated with screw 21 to change the vertical position of contact 13 with respect to the ring 14 with the greater tilt being permissible when end 15 of the contact 13 is lowered toward the ring 14 and with the least amount of tilt being permissible when the end 16 of the contact 13 is raised toward the ring 14.

The floating contact 13 is electrically connected with an "on" and "off" switch 26 through the suspension wire 17, ratchet wheel 20 and by means of an elongated spring terminal 27 connected with the switch at a terminal 28. Terminal 27 includes a V-shaped ridge 29 that rides in the notches of ratchet 29 to provide detent means to lock screw 21 and to permit finer adjustment of the screw 21 to regulate the elevation of contact 13 in ring 14.

Ring 14 is secured to a rectangularly shaped sleeve 30 that is vertically adjustable on a stiff rectangularly shaped support bar 31 and a screw 32 or the like locks sleeve 30 to bar 31. This arrangement holds ring 14 against lateral displacement or flexing in relation to the support bar and provides for an alternative vertical adjustment of ring 14 in relation to contact 13 which may be desirable under certain conditions of operation or to introduce limited adjustments re members 13 and 14.

As shown in FIGS. 1 and 3, bar 31 rigidly depends from a bracket 33 having two legs 34 connected to cover 2 by screws or the like 35 and a strap 36 is secured to bracket 33 to tightly hold bar 31 therebetween as shown in FIG. 3.

Cover 2 is preferably made of insulating material and housing 1 may be of the same insulating structure and is so shown in the drawing. The object is to separate the contact 13 circuit from the ring 14 circuit.

The circuit from contact 13 is completed through switch 26 to wire 37 and from ring 14 through bar 31 to the bracket and strap to wire 38 held on the strap 36 by screw 39. Both wires 37 and 38 leave the enclosure means 1 and 2 through a grommet 40 in cover 2 for connection with any external means subject to regulation by the tilt or inertia control device.

As an example, wires 37 and 38 connect through a battery 41 to a relay coil 42 and undue tilt will cause a latching armature 43 to break the circuit to a motor 44 to interrupt the drive to a displaceable or floating conveyor or feed means 45 that must at all times hold a given position for the purpose of preventing spilling of conveyor held material. After the abnormal condition is corrected the armature can be unlatched and the motor started again to continue operation of the conveyor again under the regulation of the tilt control device with switch 26 in "on" position.

In the FIG. 4 construction, the tilt control device is a self-contained unit in that a battery 46 is carried within housing 1 together with a bell or buzzer 47 with the circuit in this case, for example, being from one of the battery wires to the buzzer and from the buzzer to switch 26 to contact 13, with the other battery wire going to securing screw 39 for connection with ring 14 by way of bar 31.

FIG. 4 also shows a different support or fastening structure to mount the tilt control device and also one type of orientation arrangement that can be associated with the device. For attachment, the housing has a ball support 48 to receive a universal clamp mechanism 49 that carries a securing bracket 50 to mount the housing 1 of the device on a selected apparatus and with the housing in any selected position in relation to the apparatus or to a fixed part thereof. While this universal mounting is shown connected with the right face of the device, it could be connected to any one of the outer surfaces 7, 8, 9, 10, 11 or 12 of the housing 1 with equal facility and for the same purpose.

As a further feature, suitable orientation means are shown as attached levels 51 and 52 to provide means on the device for positioning the box or casing of the device in a given relation with respect to the supporting bracket sctructure as will be readily apparent to those skilled in the art. This orientation means will establish the floating conical contact 13 and ring 14 in their normal operative but dormant centered positions subject to displacement by excessive or limited tilt all according to the adjustment of the screw 21 and/or the ring sleeve 30 as the case may be.

The foregoing description was directed to certain preferred embodiments of the invention which are only disclosed by way of example and not by way of limitation. The breadth and scope of the invention is, therefore, not to be limited to such disclosures but only to the extent that the inventive concept of the tilt control device shall be governed by the language in the following claimed subject matter.

What I claim is:

1. A tilt control device including a housing having attachment means to mount the device on a part of an apparatus subject to a given position and/or to bodily motion between permissible limits for the normal operation of said apparatus, said device comprising a floating contact in said housing, a support member on said housing, a suspension means on said support member depending therefrom and connected with said floating contact to orient said latter contact in a predetermined elevated position within said housing, a rigid ring contact in said housing encircling said floating contact at a predetermined transverse level and in given spaced relation in all directions radially about said floating contact, and a rigid support bar connected with said housing to depend laterally adjacent and beyond said rigid ring contact, said rigid ring contact including slidable means with locking screw on said support bar to dispose said rigid contact in a vertically adjusted and selected rigid and fixed operable position level in relation to said floating contact, said coacting contacts being electrically connected with a normally deenergized alarm circuit and providing means to energize said alarm circuit whenever said apparatus part is abnormally bodily displaced causing said floating contact to engage said ring contact through the motion imparted to the housing of said device by said apparatus part.

2. In a tilt control device as set forth in claim 1 wherein said floating contact is a weighted plumb bob hanging on a flexible suspension means to always seek a normal vertically suspended position within said housing and one that is coaxial with the diametral center of said ring contact, and wherein said slidable means of said rigid ring contact and said support bar are complementarily shaped in cross section to provide coincident corresponding flat sides to counteract lateral swingable displacement of the rigid ring contact in relation to its support bar.

3. In a tilt control device as set forth in claim 1 with the addition of leveling instruments mounted on said housing on at least two angularly disposed adjacent and contiguous sides of said housing which sides are vertically parallel with the suspension means of said floating contact when said means is in neutral inactive vertical position in said housing to provide means to orient the contact elements in predetermined fully electrically open relation to each other within said housing.

4. In a tilt control device providing, in combination, a pair of coacting circuit making contacts, a flexible means to suspend one contact and a rigid means to position the other contact, one of said contacts having a tapered exterior shape and said other contact providing a ring to encircle its companion contact, and adjusting means independently connected with each one of said contacts to move them independently relatively to the other to adjust the relative touching distance between the tapered exterior of said one contact and the ring contact to thus vary the amount of movement needed for the flexibly suspended contact to engage the rigidly suspended contact and to selectively regulate and limit the operative vertical range of said other contact over the narrower or larger diameter ends of the companion tapered contact respectively.

5. In a tilt control device as set forth in the claim 4 combination wherein said adjusting means for one of said contacts comprises a screw member threaded through said housing cover and connected with said one contact to raise and lower the contact in relation to said other contact and indicia means are provided on said housing cover for the screw member to denote the exact position of said one contact in relation to said housing cover per se.

6. In a tilt control device providing, in combination, a pair of coacting circuit making contacts, a flexible means to suspend one contact and a rigid means to position the other contact, one of said contacts having a tapered exterior shape and said other contact providing a ring to encircle its companion contact, and adjusting means connected with at least one of said contacts to move said one relatively to the other thereof to adjust the relative touching distance between the tapered exterior of said one contact and the ring contact to thus vary the amount of movement needed for the flexibly suspended contact to engage the rigidly suspended contact, said adjusting means comprising a vertically movable screw member having a circular element thereon but insulated therefrom to support said flexible means, said circuit from said contact on said flexible means being completed to an electrical control circuit by means of a spring contact disposed radially with respect to the path of adjustment of said screw member and in touching engagement with said circular element, said spring contact extending in the direction of motion of said vertically movable screw member for constant engagement with said circular element for any selected adjusted position of said screw member.

7. In the tilt control device of claim 6 with the addition of an elongated ridge on the surface of said spring touching said circular element, and said circular element being provided with a notched periphery to receive said ridge of the spring contact to provide detent mechanism to hold the screw member firmly in an adjusted position and to aid in making finer gauged vertical adjustments of said flexibly suspended contact with said screw member.

8. In the combination set forth and defined in claim 6, wherein said vertically movable member, its circular element, the flexible means for said one contact, and said tapered exterior contact are all symmetrically arranged about their common coincident axes so as not to affect or influence the swinging motion of said flexibly suspended contact member under tilted conditions.

References Cited

UNITED STATES PATENTS

| | | | |
|---|---|---|---|
| 1,230,787 | 6/1917 | Robison et al. | 200—61.51 X |
| 1,902,578 | 3/1933 | Parsons | 200—61.51 |
| 2,407,122 | 9/1946 | Young | 200—61.49 |
| 2,448,597 | 9/1948 | Jolley et al. | 200—61.51 X |
| 2,850,291 | 9/1958 | Ziccardi | 280—150 |

THOMAS B. HABECKER, *Primary Examiner.*

NEIL C. READ, *Examiner.*

D. L. TRAFTON, *Assistant Examiner.*